(12) United States Patent
Kadambala et al.

(10) Patent No.: US 10,038,500 B1
(45) Date of Patent: Jul. 31, 2018

(54) VISIBLE LIGHT COMMUNICATION

(71) Applicant: QUALCOMM Incorporated, San Diego, CA (US)

(72) Inventors: Ravi Shankar Kadambala, Hyderabad (IN); Bapineedu Chowdary Gummadi, Hyderabad (IN); Pradeep Veeramalla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/592,431

(22) Filed: May 11, 2017

(51) Int. Cl.
*H04B 10/00* (2013.01)
*H04B 10/116* (2013.01)
*H04B 1/3827* (2015.01)

(52) U.S. Cl.
CPC ......... *H04B 10/116* (2013.01); *H04B 1/3833* (2013.01)

(58) Field of Classification Search
CPC . G06T 2207/10024; G06T 5/009; G06T 5/40; H04N 5/23229; H04N 5/232; H04N 13/106; H04N 13/161; H04B 10/116
USPC ........................................................ 398/118
See application file for complete search history.

(56) References Cited

U.S. PATENT DOCUMENTS

| 2003/0081133 | A1* | 5/2003 | Lee ..................... H04N 5/23293 348/229.1 |
| 2009/0315977 | A1* | 12/2009 | Jung ..................... G06T 15/005 348/42 |
| 2013/0016978 | A1 | 1/2013 | Son et al. |
| 2014/0270796 | A1 | 9/2014 | Jovicic et al. |
| 2014/0321859 | A1* | 10/2014 | Guo ..................... H04B 10/116 398/118 |
| 2017/0244482 | A1* | 8/2017 | Dimare ................ H04B 10/116 |
| 2017/0350962 | A1* | 12/2017 | Jovicic ..................... G01S 5/16 |

FOREIGN PATENT DOCUMENTS

| CN | 103812558 A | 5/2014 |
| EP | 2456100 A1 | 5/2012 |
| JP | 2007019870 A | 1/2007 |

* cited by examiner

*Primary Examiner* — Don N Vo
(74) *Attorney, Agent, or Firm* — Hunter Clark PLLC

(57) ABSTRACT

A method of operating a device that includes an image sensor including a plurality of pixels includes: detecting visible light communication (VLC) signals with the image sensor; obtaining image data based on the VLC signals, the image data including a set of brightness components and possibly a set of chrominance components, and each brightness component of the set of brightness components being associated with a respective pixel of the plurality of pixels and (if available) each chrominance component of the set of chrominance components being associated with a respective pixel of the plurality of pixels; and decoding the set of brightness components to obtain information encoded in the VLC signals using a processor of the device without decoding, if available, the set of chrominance components.

30 Claims, 12 Drawing Sheets

|      | FRAME 1 | FRAME 2 | FRAME 3 | FRAME 4 | FRAME 5 | FRAME 6 |
|------|---------|---------|---------|---------|---------|---------|
|      | Y1      | Y2      | Y3      | Y4      | Y5      | Y6      |
|      | U1      | U2      | U3      | U4      | U5      | U6      |
|      | V1      | V2      | V3      | V4      | V5      | V6      |

*FIG. 5*

| FRAMES 1-3 | FRAMES 4-6 | FRAMES 7-9 | FRAMES 10-12 | FRAMES 13-15 | FRAMES 16-18 |
|---|---|---|---|---|---|
| Y1 | Y4 | Y7 | Y10 | Y13 | Y16 |
| Y2 | Y5 | Y8 | Y11 | Y14 | Y17 |
| Y3 | Y6 | Y9 | Y12 | Y15 | Y18 |

FIG. 6

VISIBLE LIGHT COMMUNICATION

BACKGROUND

Visible Light Communication (VLC) is a technique for communicating information using visible light. There are several advantages to using VLC over conventional wireless communication that relies on radio frequency (RF) signals. First, the visible light spectrum (with wavelengths in the range 380 nm to 780 nm) is not regulated or restricted for use by regulatory agencies. Second, the visible light spectrum is less "crowded" than the available RF spectrum because visible light is local and does not permeate physical obstacles, such as buildings and walls. Thus, unlike RF signals, which can interfere with other RF signals in the general vicinity, VLC signals from a VLC light source only interfere with other visible light sources that are within a line of sight of a device receiving the VLC signal. Third, a VLC receiver can determine the location of the source of the VLC signal using an image sensor. Thus, a device that includes a VLC receiver can use the VLC signal to determine the position of the device indoors where RF signals from global positioning systems can be unreliable. Fourth, VLC light sources can be included in existing light fixtures that produce lighting in indoor and outdoor spaces because humans cannot perceive the modulation of the light source used to encode information in the VLC signals. For example, Light Emitting Diodes (LEDs) capable of generating white light are likely to become the dominant source of lighting in the commercial and residential sectors. LED lighting provides an opportunity to emit light that includes encoded VLC signals for a wide range of applications.

VLC signals can be encoded in various ways. One particular example is pulse width modulation (PWM) in which information is encoded by turning on and off the light source using a number of cycles per second that his greater than human eyes can perceive (e.g., greater than 150 Hz). Information encoded in the VLC signals can be used in a variety of applications, including determining the position of the device that receives the VLC signals.

SUMMARY

An example method of operating a device that includes an image sensor including a plurality of pixels includes: detecting visible light communication (VLC) signals with the image sensor; obtaining image data based on the VLC signals, the image data including a set of brightness components and a set of chrominance components, and each brightness component of the set of brightness components being associated with a respective pixel of the plurality of pixels; and decoding the set of brightness components to obtain information encoded in the VLC signals using a processor of the device without decoding a set of chrominance components if included within the image data.

Implementations of such a method may include one or more of the following features. The method may include storing only the set of brightness components in a memory for use in decoding the VLC signals. The method may further include discarding the set of chrominance components, if included within the image data, prior to decoding the set of brightness components. Obtaining the image data may include: obtaining sensor data from the image sensor; making a first adjustment to the sensor data when the processor is operating in a VLC mode to create adjusted sensor data, the VLC mode being a mode of operation of the processor used for decoding the VLC signals; and making a second adjustment to the sensor data when the processor is operating in a photography mode, the photography mode being a mode of operation of the processor used for creating photographic images from the sensor data, and the second adjustment being different from the first adjustment. The making the second adjustment to the sensor data when the processor is operating in the photography mode may include performing a first set of operations on the sensor data. The making the first adjustment to the sensor data when the processor is operating in the VLC mode may include performing a second set of operations on the sensor data, the second set of operations being a subset of the first set of operations. The performing the first set of operations when the processor is operating in the photography mode may include processing the sensor data using at least one chrominance-related operation and at least one brightness-related operation. The performing the second set of operations when the processor is operating in the VLC mode may include processing the sensor data using, from among the at least one brightness-related operation and the at least one chrominance-related operation, only the at least one brightness-related operation. The image data may include raw image data. The method may further include determining a location of the device based on the set of brightness components.

An example device include an image sensor comprising a plurality of pixels, the image sensor configured to detect visible light communication (VLC) signals; a processor configured to: obtain image data based on the VLC signals, the image data comprising a set of brightness components and a set of chrominance components, each brightness component of the set of brightness components being associated with a respective pixel of the plurality of pixels; and decode the set of brightness components to obtain information encoded in the VLC signals without decoding a set of chrominance components if included within the image data.

Implementations of such a device may include one or more of the following features. The device may include a memory configured to store the set of brightness components, and the processor may be further configured to cause the memory to store only the set of brightness components for use in decoding the VLC signals. The processor may be further configured to discard the set of chrominance components, if included within the image data, prior to decoding the set of brightness components. The processor may be configured to: obtain sensor data from the image sensor; make a first adjustment to the sensor data when the processor is operating in a VLC mode to create adjusted sensor data, the VLC mode being a mode of operation of the processor used for decoding the VLC signals; and make a second adjustment to the sensor data when the processor is operating in a photography mode, the photography mode being a mode of operation of the processor used for creating photographic images from the sensor data, and the second adjustment being different from the first adjustment. The processor may be configured to make the second adjustment to the sensor data when the processor is operating in the photography mode by performing a first set of operations on the sensor data. The processor may be configured to make the first adjustment to the sensor data when the processor is operating in the VLC mode by performing a second set of operations on the sensor data, the second set of operations being a subset of the first set of operations. The processor may be configured to perform the first set of operations when the processor is operating in the photography mode by processing the sensor data using at least one chrominance-related operation and at least one brightness-related operation. The processor may be configured to perform the second set of operations when the processor is operating in the VLC mode by processing the sensor data using, from among the at least one brightness-related operation and the at least one chrominance-related operation, only the at least one brightness-related operation. The image data may include raw image data. The processor may be configured to determine a location of the device based on the set of brightness components An example of a device includes means for detecting visible light communication (VLC) signals including a plurality of pixels; means for obtaining image data based on the VLC signals, the image data including a set of brightness components and a set of chrominance components, each brightness component of the set of brightness components being associated with a respective pixel of the plurality of pixels; and means for decoding the set of brightness components to obtain information encoded in the VLC signals without decoding a set of chrominance components if included within the image data.

Implementations of such a device may include one or more of the following features. The device may include means for storing only the set of brightness components for use in decoding the VLC signals. The device may include means for discarding the set of chrominance components, if included within the image data, prior to decoding the set of brightness components. The means for obtaining image data may include means for obtaining sensor data from the means for detecting VLC signals; means for making a first adjustment to the sensor data when the device is operating in a VLC mode, the VLC mode being a mode of operation of the device used for decoding the VLC signals; and means for making a second adjustment to the sensor data when the device is operating in a photography mode, the photography mode being a mode of operation of the device used for creating photographic images from the sensor data, and the second adjustment being different from the first adjustment. The means for making the second adjustment may include means for performing a first set of operations on the sensor data. The means for making the first adjustment may include means for performing a second set of operations on the sensor data, the second set of operations being a subset of the first set of operations. The means for performing the first set of operations may include means for processing the sensor data with at least one chrominance-related operation and at least one brightness-related operation. The means for performing the second set of operations may include means for processing the sensor data using the at least one brightness-related operation. The image data may include raw image data. The device may further include means for determining a location of the device based on the set of brightness components.

An example of a non-transitory, processor-readable storage medium includes processor-readable instructions configured to cause a processor of a device that includes an image sensor comprising a plurality of pixels to: obtain image data based on visible light communication (VLC) signals detected by the image sensor, the image data comprising a set of brightness components and a set of chrominance components, each brightness component of the set of brightness components being associated with a respective pixel of the plurality of pixels; and decode the set of brightness components to obtain information encoded in the VLC signals without decoding a set of chrominance components if included within the image data.

Implementations of such a non-transitory, processor-readable storage medium may include one or more of the following features. The non-transitory, processor-readable storage medium may include instructions configured to cause the processor to store only the set of brightness components in a memory for use in decoding the VLC signals. The non-transitory, processor-readable storage medium may include instructions configured to cause the processor to discard the set of chrominance components, if included within the image data, prior to decoding the set of brightness components. The instructions configured to cause the processor to obtain the image data include instructions configured to cause the processor to: obtain sensor data from the image sensor; make a first adjustment to the sensor data when the processor is in a VLC mode, the VLC mode being a mode of operation of the processor used for decoding the VLC signals; and make a second adjustment to the sensor data when the processor is operating in a photography mode, the photography mode being a mode of operation of the processor used for creating photographic images from the sensor data, and the second adjustment being different from the first adjustment. The instructions configured to cause the processor to make the second adjustment to the sensor data when the processor is operating in the photography mode may include instructions configured to cause the processor to perform a first set of operations on the sensor data. The instructions configured to cause the processor to make the first adjustment to the sensor data when the processor is operating in the VLC mode may include instructions configured to cause the processor to perform a second set of operations on the sensor data, the second set of operations being a subset of the first set of operations. The instructions configured to cause the processor to perform a first set of operations on the sensor data may include instructions configured to cause the processor to process the sensor data using at least one chrominance-related operation and at least one brightness-related operation. The instructions configured to cause the processor to perform a second set of operations on the sensor data may include instructions configured to cause the processor to process the sensor data using, from among the at least one brightness-related operation and the at least one chrominance-related operation, only the at least one brightness-related operation. The image data may include raw image data. The device may further include instructions configured to cause the processor to determine a location of the device based on the set of brightness components.

BRIEF DESCRIPTION OF THE DRAWINGS

Non-limiting and non-exhaustive examples of methods and systems are described with reference to the following figures. The figures may not be drawn to scale.

FIG. 5 a block diagram of an example buffer memory of the mobile device of FIG. 4 when operating in a photography mode.

FIG. 6 is a block diagram of an example of the buffer memory of the mobile device of FIG. 4 when operating in a VLC mode.

DETAILED DESCRIPTION

Items and/or techniques described herein may decrease power consumption and decrease memory usage when processing detected VLC signals as compared to conventional techniques for processing VLC signals. For example, the amount of memory used by an example mobile device implementing the techniques may reduce the amount of memory used by as much as 66%. Other capabilities may be provided and not every implementation according to the disclosure must provide any, let alone all, of the capabilities discussed.

Techniques are discussed herein for operating a mobile device with an image sensor to detect and decode a VLC signal. Conventionally, an image sensor of the mobile device detects light signals and a VLC decoder processor of the mobile device decodes both chrominance components and brightness components of image data indicative of the light signals to obtain encoded information of VLC signals. Conversely, a VLC decoder processor of an example mobile device may use the brightness components of the image data to obtain the encoded information of the VLC signals. Preferably, the VLC decoder does not decode the chrominance components of the image data. Further, the mobile device may discard the chrominance components and save the brightness components for use by the VLC decoder processor.

To record photographs or videos with the image sensor, the example mobile device implements a processing pipeline for automatically adjusting sensor data (which may comprise, for example, un-processed (e.g., raw) sensor data, pre-processed sensor data, or some combination thereof) from the image sensor to improve image quality. The mobile device may also use certain portions of the processing pipeline for automatically adjusting sensor data associated with a detected VLC signal. For example, the processing pipeline may include a number of separate image processing operations. The mobile device processes VLC signals by processing image data with a first subset of the image processing operations that impact the brightness components of the image. Preferably, when operating in a VLC mode used for detecting VLC signals, the mobile device does not implement a second subset of the image processing operations that do not have substantial impact on the brightness components of the image. For example, in the VLC mode (as opposed to a photography mode used for taking photographs and videos), an image data processor of the mobile device 10 performs a portion of the image processing operations included in the processing pipeline. By reducing the number of image processing operations, the mobile device uses less power to detect and decode VLC signals as compared to a technique that uses all of the image processing operations of the processing pipeline that are used when the mobile device and the image data processor operate in the photography mode.

Figure 1:
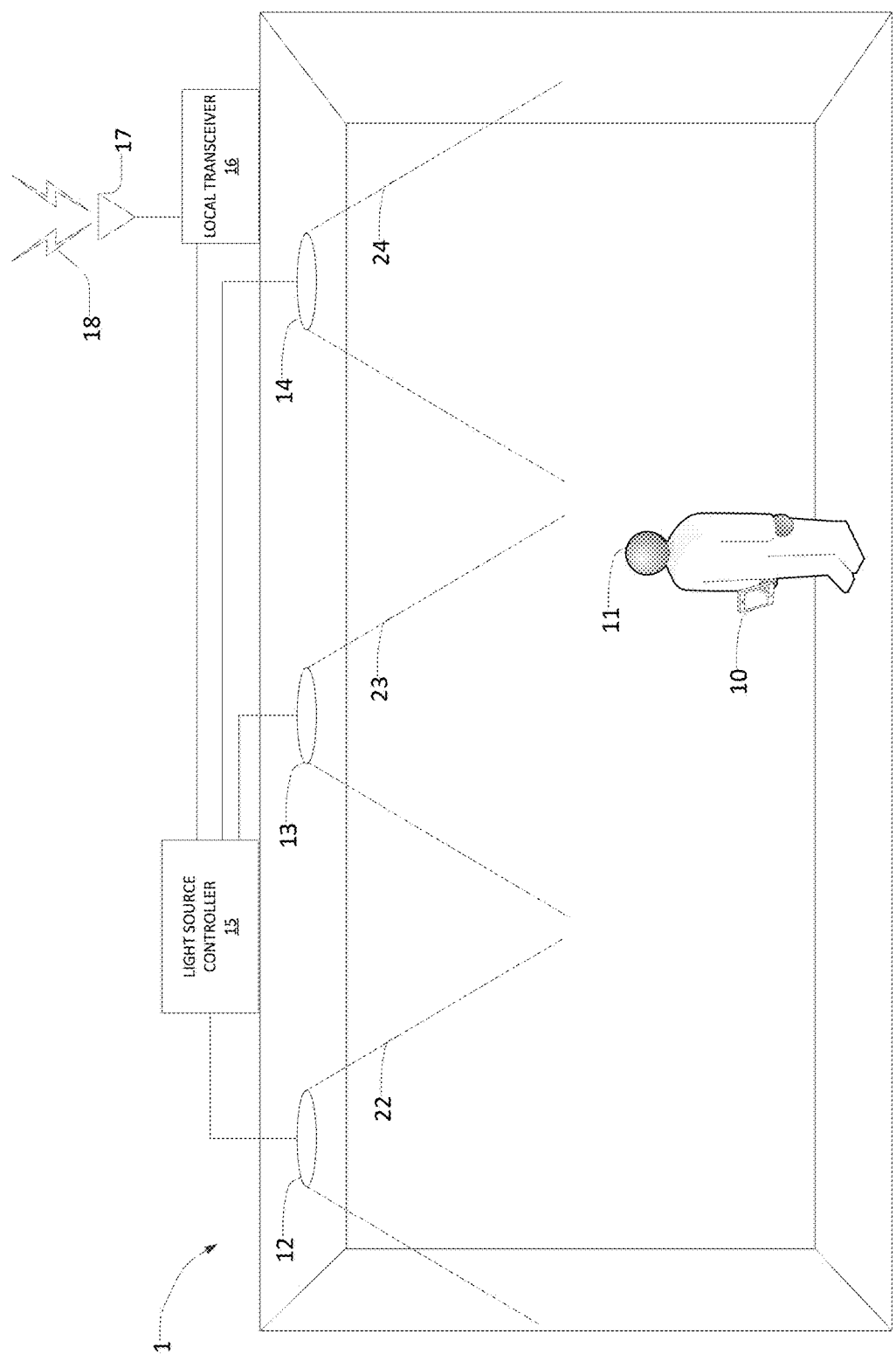
FIG. 1 is a simplified diagram of an example VLC environment.

Referring to FIG. 1, a VLC environment 1 includes light sources 12-14, a light source controller 15 and a local transceiver 16. The light sources 12-14 are configured to communicate information to a mobile device 10 of a user 11, who is in the VLC environment 1. The light sources 12-14 may be light fixtures that serve the dual purpose of being configured to provide light 22-24, respectively, for illuminating the VLC environment 1 and communicate the information to the mobile device 10. The light 22-24 emitted from the light sources 12-14 is broad spectrum light, which may have different spectral characteristics based on the preferences of the user 11 or the operator of the VLC environment. For example, the light 22-24 may have spectra that closely emulate incandescent light fixtures, fluorescent light fixtures or sunlight. The light sources 12-14 may include one or more light emitting diodes (LEDs) that individually, or collectively, emit light with the desired spectral properties.

The light sources 12-14 are configured to emit the light 22-24 encoded with information that may be obtained by the mobile device 10 by decoding the image data associated with detecting the light 22-24. The light sources 12-14 are communicatively coupled to a light source controller 15 which is configured to control the light sources 12-14 to affect at least one property of the light 22-24 to encode the information into the light 22-24. The light source controller 15 is communicatively coupled to the light sources 12-14 via, for example, a wired connection or a wireless connection. The light source controller 15 is configured to encode information into the light 22-24 from the light sources 12-14 in a way that does not create a significant visual difference to the user 11, who may be using the light for general illumination purposes, when compared to light that does not include encoded information. For example, the light sources 12-14 may modulate the light at a frequency that is higher than is visually perceptible by a user 11. By way of example and not limitation, the light source controller 15 can control the light sources 12-14, which may include LEDs, to modulate the brightness of the light 22-24 at frequencies that are higher than a flicker fusion threshold of the user 11. The flicker fusion threshold is a frequency at which no noticeable flicker is observed by the user 11 and the modulated brightness of the light 12-14 is perceived by the user as a constant brightness (e.g., intensity modulation with frequencies in the 1-5 KHz range). The light sources 12-14 may include LED drivers capable of performing pulse width modulation (PWM) at these frequencies. The light source controller 15 is configured to receive the information to be encoded in the light 22-24 from an information source. For example, the information encoded in the light 22-24 can be information that the owner or operator of the VLC environment 1 wants to communicate to the mobile device 10. The owner or operator of the VLC environment 1 may provide the information to the light source controller 15. This encoded information may be advertising information related to the business that controls the light sources 12-14. The information encoded in the light 22-24 may include an identifier of the light source 12-14. For example, light source 12 encodes the light 22 with a first identifier, light source 13 encodes the light 23 with a second identifier, and light source 14 encodes the light 24 with a third identifier. Alternatively or additionally, the encoded information may include location information about the light source. For example, the encoded information may include global positioning coordinates of the light source (e.g., a latitude and longitude) or local positioning coordinates of the light source (e.g., an indication of where the light source is within a building).

The encoded information in the light 22-24 may be used by the mobile device 10 for one or more of a variety of purposes, e.g., for determining the position of the mobile device 10. The mobile device 10 is configured to decode the image data associated with detecting the light 22-24 to obtain the identifiers of the light sources 12-14 that are included in the encoded information. The mobile device 10 may use the identifiers, in connection with mapping data that indicates the locations of the light sources associated with the different identifiers within the VLC environment 1, to determine the location of the mobile device 10. The mapping data can include locations of the light sources 12-14 so that the mobile device 10 can use the identifiers, measured ranges and/or angles to the light sources 12-14, and the locations of the light sources 12-14 to determine the location of the mobile device 10. Alternatively, the encoded information of the light 22-24 may include the respective locations of the light sources 12-14.

The mapping data that identifies the locations of the light sources 12-14 that encode light 22-24 with particular identifiers can be sent to the mobile device 10 using a local transceiver 16. The local transceiver 16 may be a wireless base transceiver station (BTS), a Node B, an evolved NodeB (eNB), a Wi-Fi access point (AP), a femtocell, a Home Base Station, a small cell base station, a Home Node B (HNB) or a Home eNodeB (HeNB) and may provide access to a wireless local area network (WLAN, e.g., IEEE 802.11 network), a wireless personal area network (WPAN, e.g., Bluetooth® network or ZigBee® network) or a cellular network (e.g. an LTE network or other wireless wide area network). The local transceiver 16 is configured to transmit information via an antenna 17 to the mobile device via a wireless signal 18, the information including the mapping data. The transmitted information may be referred to as assistance data because the mobile device 10 is configured to use the information in conjunction with the light 22-24 from the light sources 12-14 to perform indoor positioning without receiving satellite-based positioning signals, which can be difficult to receive indoors leading to imprecise positioning results.

In addition to basing the positioning of the mobile device 10 on the identifiers decoded from one or more light sources, the mobile device 10 can obtain more precise positioning by determining the angle of arrival (AOA) of the light 22-24 from the light sources 12-14, respectively. The AOA may be determined using, for example, the shape and/or size of a group of pixels corresponding to each of the light sources 12-14 on an image sensor of the mobile device 10 and the orientation of the mobile device 10, which may be obtained from an orientation sensor of the mobile device 10. For example, in FIG. 1, the light 22 incident on the image sensor of the mobile device 10 may appear, from the perspective of the mobile device 10, to have a different shape and/or size than the light 23, e.g., due to the light 22 arriving at the mobile device 10 with a larger angle of incidence than the light 23 which is from the light source 13, which is directly above the image sensor of mobile device 10 when the mobile device is oriented parallel to the ground, facing upward. After determining the AOA for each of the light sources, the position of the mobile device 10 within the VLC environment 1 can be more precisely determined than would be possible without the AOA information.

While FIG. 1 illustrates light sources 12-14 as light fixtures within the VLC environment 1, VLC signals can also be transmitted from dedicated VLC light sources (not shown in FIG. 1). Such light sources may provide directional light that does not significantly illuminate the VLC environment 1 for user 11. For example, lasers or LEDs may be placed at various locations within the VLC environment 1 to improve the VLC capabilities.

Figure 2:
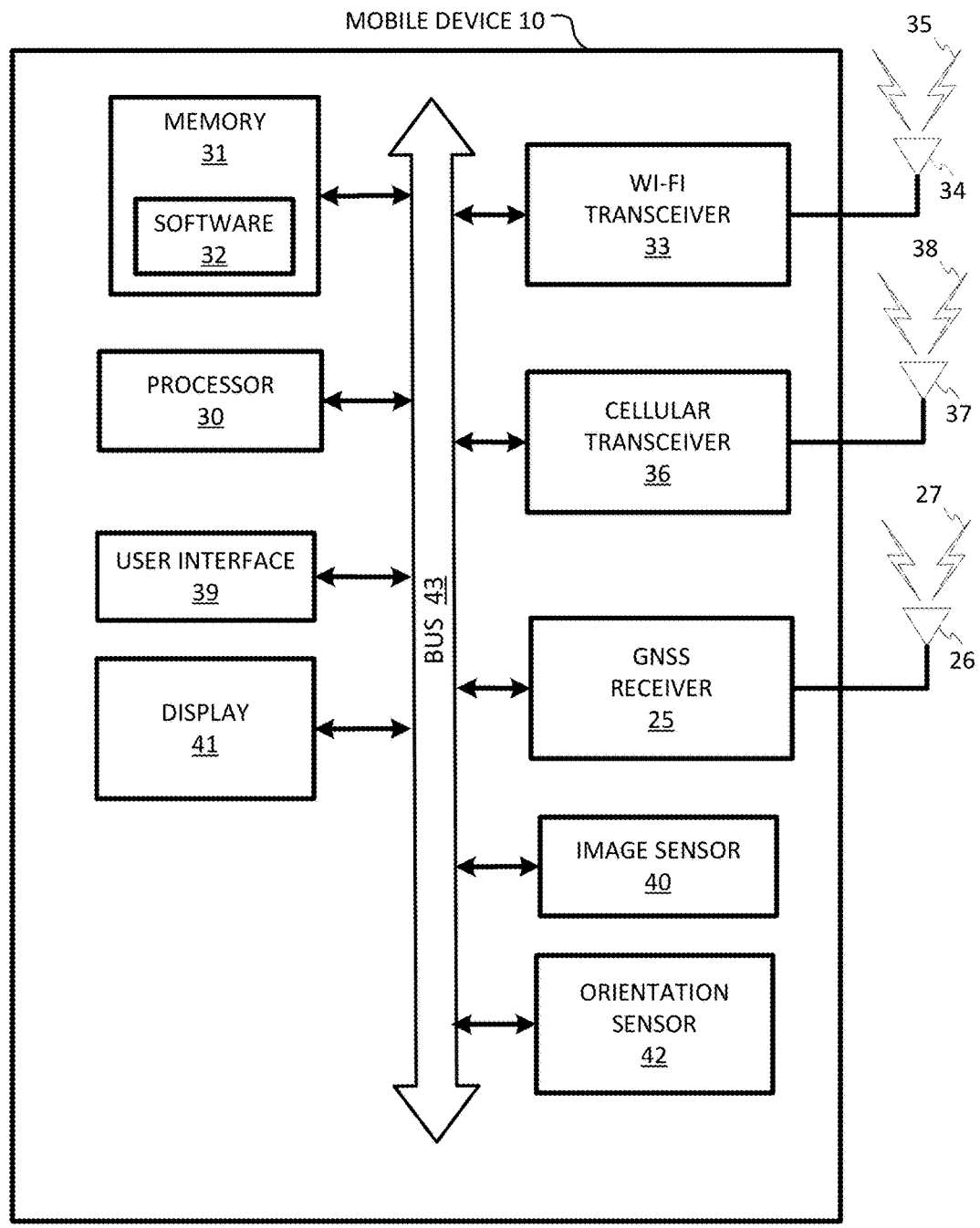
FIG. 2 is a block diagram of an example of a mobile device that operates within the VLC environment of FIG. 1.

Referring to FIG. 2, with further reference to FIG. 1, an example of the mobile device 10 includes a processor 30, a memory 31 including software 32, a Wi-Fi transceiver 33, a cellular transceiver 36, a Global Navigation Satellite System (GNSS) receiver 25, a user interface 39, an image sensor 40, a display 41, and an orientation sensor 42. The mobile device 10 is a computer system that may be a cellular phone, smart phone, tablet or other user equipment (UE). The Wi-Fi transceiver 33 is configured to communicate with local wireless networks by transmitting and receiving wireless signals 35 via an antenna 34 to and from base stations, such as Wi-Fi APs, femtocells, Home Base Stations, small cell base stations, HNBs or HeNBs. The cellular transceiver 36 is configured to communicate with a cellular communication network by transmitting and receiving wireless signals 38 via an antenna 37 to and from base stations, such as wireless BTSs, Node Bs, eNBs, etc. The processor 30 is an intelligent device, e.g., a central processing unit (CPU) such as those made or designed by Qualcomm®, ARM®, Intel® Corporation, or AMD®, a microcontroller, an application specific integrated circuit (ASIC), etc. The processor 30 may, for example, include an image data processor (also known as an image signal processor). The mobile device 10 may include more than one processor. For example, there may be a dedicated processor for processing data from the image sensor and/or a dedicated processor for decoding VLC signals. The memory 31 is a non-transitory, processor-readable storage medium that stores instructions that may be executed by the processor 30 and includes random access memory (RAM), read-only memory (ROM) and non-volatile memory such as flash memory or solid state storage. The software 32 can be loaded onto the memory 31 by being downloaded via a network connection, uploaded from a disk, etc. Further, the software 32 may not be directly executable, e.g., requiring compiling before execution. The software 32 includes instructions configured to cause the processor 30 to perform functions described herein.

The GNSS receiver 25 receives a wireless signal 27, via an antenna 26, from a plurality of satellites. The GNSS receiver 25 includes the necessary systems (not shown) for measuring the code phase, carrier phase and Doppler shift of the wireless signal 27, such as a delay lock loop and a phase lock loop. The GNSS receiver 25 may be configured to measure signals associated with a Global Positioning System (GPS), a Galileo system, a GLONASS system, a Beidou (Compass) system, etc.

The user interface 39 is configured to receive input information from the user 11. The user interface 39 may include one or more tactile interfaces, such as buttons and/or a touchscreen display for receiving input from the fingers of a user 11, or audio interfaces, such as a microphone for receiving voice commands from the user 11. The user 11 may use the user interface 39 to select a mode of operation of the mobile device 10. For example, the user 11 may select whether the mobile device 10 operates in a photography mode or a VLC mode.

The display 41 may be a liquid-crystal display (LCD) (e.g., a thin-film transistor (TFT) display), although other forms of displays are acceptable. The display 41 is configured to display VLC information, such as advertising information or location information to the user 11 of the device 10. For example, the display 41 may display coordinates and/or a graphical representation of the position of the device 10 on a map. While FIG. 2 illustrates the user interface 39 and the display 41 as separate, they may be the same unit, for example, when the device 10 includes a touchscreen display.

The orientation sensor 42 is configured to determine the orientation of the mobile device 10. For example, the orientation sensor 42 may determine a direction in which the image sensor 40 of the device 10 is pointed. This direction may be used by the processor 30 to determine the AOA of the light 22-24, which may be used to determine the location of the mobile device 10 relative to the light sources 12-14. To determine the orientation, the orientation sensor 42 may include one or more accelerometers, gyroscopes, or geomagnetic field sensors.

The various components of the mobile device 10 are communicatively coupled to one another via a bus 43, which is configured to transmit information from one component to another component. For example, the processor 30 is communicatively coupled to the image sensor 40 and the memory 31 via the bus 43, which allows the processor 30 to receive image information from the image sensor 40 and allows the processor 30 to control the operation of the image sensor 40.

The image sensor 40, which is described in more detail below in connection with FIG. 3, may include multiple image sensors and one or more of the multiple image sensors may be used to perform VLC signal processing at any given time. The image sensor 40 may be a multi-color image sensor, such as a conventional red, green, blue (RGB) image sensor. The image sensor 40 includes an array of pixels, each pixel configured to detect VLC light and output an electrical detection signal in response to the VLC light. The image sensor 40 also includes a photodetector readout circuit for reading out the electrical detection signals from the array of pixels.

Figure 3:
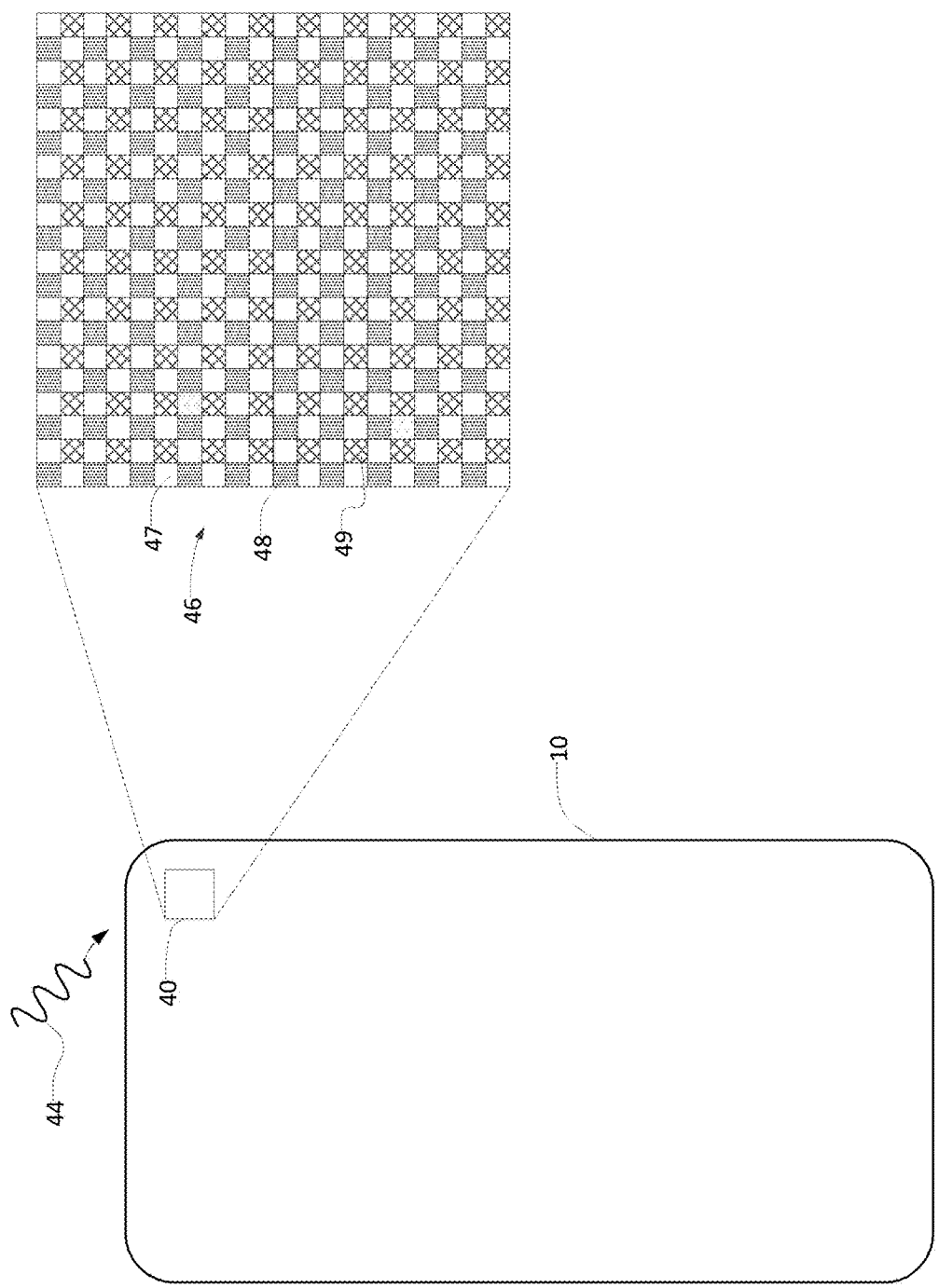
FIG. 3 is a back view of the mobile device of FIG. 2.

Referring to FIG. 3, with further reference to FIGS. 1-2, the mobile device 10 includes the image sensor 40 for detecting VLC light 44 received from the light sources 12-14 of the VLC environment 1. The image sensor 40 is a multi-color image sensor that includes an array of pixels 46. FIG. 3 illustrates the array of pixels 46 as a 20×20 array but arrays of other sizes may be used. The array of pixels 46 includes three types of pixels: green pixels 47 (illustrated with no fill pattern), red pixels 48 (illustrated with a dotted fill pattern), and blue pixels 49 (illustrated with a cross-hatched fill pattern). In this example, the number of green pixels 47 is twice the number of red pixels 48 and twice the number of blue pixels 49. The pattern of color filters illustrated in FIG. 3 is referred to as a Bayer filter mosaic. However, the image sensor 40 may have other distributions of pixel types such as an equal number of red, green and blue pixels, or another ratio of pixels. Additionally, the colors of the pixels are not limited to red, green and blue pixels or three different colors of pixels. The different color pixels may include, for example, a color filter disposed between a lens of the image sensor 40 and a photodetector of a pixel, the color filter allowing light of a particular color to pass through to the photodetector for detection. For example, the green pixels 47 may include color filters with higher transmissivity for green light than for red and blue light such that most of the green light passes through the color filter while most of the red and blue light is absorbed and/or reflected by the color filter. The green pixels 47 may also include a photodetector capable of detecting a broad spectrum of light that includes all three colors (e.g., red, green and blue). If the incident VLC light 44 includes green light, the green light passes through the green color filter and is detected by the associated photodetector.

The array of pixels 46 is configured to generate detection signals that include information about the amount of light detected by each pixel of the array. The detection signals are electrical signals output from the photodetector associated with each pixel of the array of pixels 46. The image sensor 40 may include a processor and/or circuitry configured to convert the detection signals into sensor data that indicates the amount of light detected by each pixel. The sensor data may comprise an image file that contains information about the amount of red, green and blue light detected at each pixel. Thus, in certain non-limiting example implementations, sensor data may be referred to as RGB data.

Figure 4:
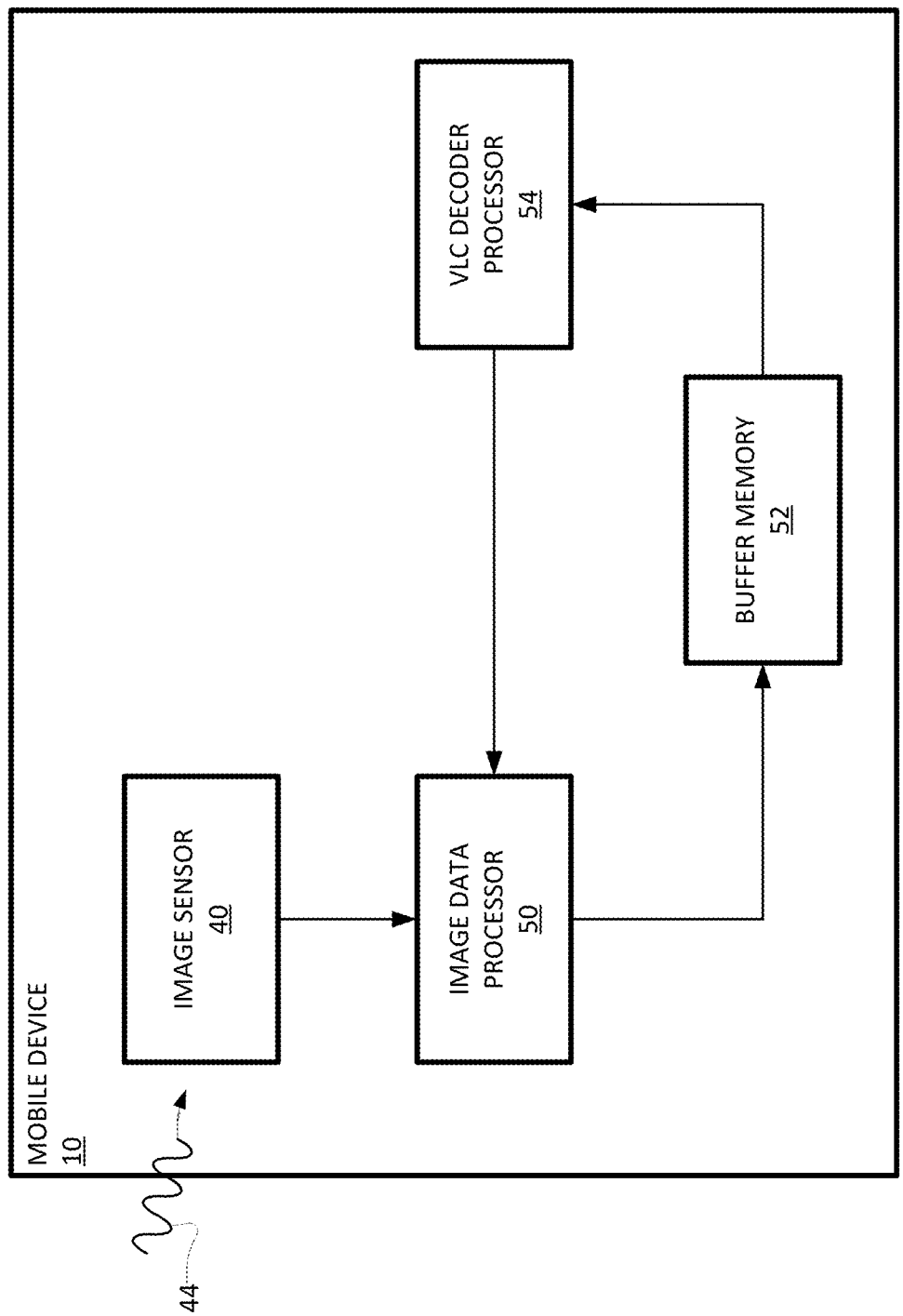
FIG. 4 is a block diagram of an example of a mobile device that operates within the VLC environment of FIG. 1.

Referring to FIG. 4, with further reference to FIGS. 1-3, the mobile device 10 may include the image sensor 40, an image data processor 50, a buffer memory 52 and a VLC decoder processor 54. The image data processor 50 and the VLC decoder processor 54 may be separate and distinct processors or may be a single processor. For example, the processor 30, shown in FIG. 2, may include both the image data processor 50 and the VLC decoder processor 54. The buffer memory 52 may be implemented using the memory 31, shown in FIG. 2, or the buffer memory 52 may be a separate memory for specific use as a buffer between the image data processor 50 and the VLC decoder processor 54.

The image sensor 40 may be activated to detect VLC light 44. The processor 30 of the device 10 is configured to determine a mode of operation of the mobile device 10. A first mode of operation is a photography mode configured for using the image sensor 40 to record photographs and/or video data. A second mode of operation is a VLC mode configured for using the image sensor 40 to detect and decode VLC light 44. The processor 30 may determine in which mode of operation to operate the mobile device 10 based on input received from the user 11 via the user interface 39, information received via the Wi-Fi transceiver 33, information received via the cellular transceiver 36, and/or image data from the image sensor 40. When the mobile device 10 operates in the photography mode, the processor 30 also operates in the photography mode, and when the mobile device 10 operates in the VLC mode, the processor 30 also operates in the VLC mode.

The image data processor 50 is configured to obtain image data based on the detected VLC light 44. The image data includes a set of brightness components and a set of chrominance components. Each brightness component of the set of brightness components is associated with a respective pixel of the array of pixels 46 of the image sensor 40 and each chrominance component of the set of chrominance components is associated with a respective pixel of the array of pixels 46 of the image sensor 40. For example, the brightness component for a particular pixel may include a luma component (referred to as Y) or a luminance component (referred to as Y'). The chrominance component for a particular pixel may include multiple components. The chrominance components for a pixel may, for example, include two components, representing a point in a two-dimensional color space. For example, a first chrominance component for a pixel may be represented as U and the second chrominance component for the pixel may be represented as V. Alternatively, the first chrominance component for the pixel may be represented as Cb and the second chrominance component for the pixel may be represented as Cr. Alternatively, the first chrominance component for the pixel may be represented as Pb and the second chrominance component for the pixel may be represented as Pr. Based on the above, the image data may include information encoded in one of a YUV format, a Y'UV format, a YCbCr format, a Y'CbCr format, or a YPbPr format. Additionally, the image data may include information encoded in a LAB format, in which a brightness component is represented by L, and the two chrominance components are represented by A and B.

The image data processor 50 is configured to obtain the image data by obtaining the sensor data from the image sensor 40 and converting the sensor data into the image data. The sensor data may include a plurality of sets of color components, each set of color components being associated with a respective pixel of the array of pixels 46 and comprising a first color component, a second color component and third color component. For example, each frame of sensor data may include a red component, a green component, and a blue component for each pixel. The frame of sensor data is referred to as RGB data. The RGB data is one example of sensor data. The image data processor 50 is configured to convert the sensor data to one of the above brightness-chrominance image data formats mentioned above (e.g., YUV, Y'UV, YCbCr, Y'CbCr, YPbPr, and LAB) using techniques that are known in the art. However, before converting the sensor data (e.g., the RGB data) to a brightness-chrominance image data format, the image data processor 50 is configured to adjust the sensor data to create adjusted sensor data. Adjustments to the sensor data are part of a processing pipeline implemented to alter the resulting image data such that it is better suited for its particular purpose. For example, when the mobile device 10 is operating in a photography mode, the processing pipeline of the image data processor 50 adjusts the sensor data such that the resulting image data results in more pleasing photographs than photographs created using the unadjusted sensor data. When the mobile device 10 is operating in a VLC mode, the processing pipeline of the image data processor 50 adjusts the sensor data such that the resulting image data is more suitable for processing by the VLC decoder processor 54 than image data created from unadjusted sensor data, resulting in increased performance of the decoding of the VLC information. The adjustments made by the image data processor 50 to create the adjusted sensor data are discussed below in connection with FIGS. 7A and 7B. The image data processor 50 is configured to convert the adjusted sensor data into the image data using techniques for converting RGB data into a chrominance image data format, such as the formats mentioned above.

The image data processor 50 is further configured to store at least a portion of the image data in the buffer memory 52. The image data processor 50 may determine whether to store all of the image data in the buffer memory 52 or only a portion of the image data in the buffer memory 52 based on the mode of operation of the mobile device 10. For example, the image data processor 50 is configured to store all of the image data for a particular frame in the buffer memory 52 in response to a determination that the mobile device 10 is operating in the photography mode. Storing all of the image data for a particular frame in the buffer memory 52 includes storing the brightness component and chrominance components for each pixel of the pixel array 46 (e.g., the YUV components for every pixel of the pixel array 46 are stored in the buffer memory 52). On the other hand, the image data processor 50 is configured to store only a portion of the image data for a particular frame in the buffer memory 52 in response to a determination that the mobile device 10 is operating in the VLC mode. Storing only a portion of the image data for a particular frame in the buffer memory 52 may include storing only the brightness component for each pixel of the pixel array 46 (e.g., only the Y components for every pixel of the pixel array 46 are stored in the buffer memory 52).

Referring to FIGS. 5 and 6, with further reference to FIGS. 1-4, the buffer memory 52 includes a plurality of individual storage areas referred to as buffers (each square in FIGS. 5 and 6 is an individual buffer, buffer 55 being an example of a first buffer of the buffer memory 52). Each buffer utilizes the same amount of space within the buffer memory 52. For example, a single buffer of buffer memory 52 may include a single byte of storage for each pixel of the image sensor 40. Thus, the first buffer 55 may store a set of brightness components for each frame, each brightness component of the set of brightness components being associated with a pixel of the image sensor 40. FIG. 5 represents how the image data processor 50 stores the image data in the buffer memory 52 when the mobile device 10 is operating in the photography mode and the image data is formatted as YUV data. Each frame of the image data uses three buffers of storage area: a first buffer for the set of brightness components of the image data (e.g., the Y components) and a second buffer and third buffer for the sets of chrominance components of the image data (e.g., the U and V components). Thus, a first frame of image data uses three buffers of the buffer memory 52 to store first image data components Y1, U1 and V1. A second frame of image data uses an additional three buffers of the buffer memory 52 to store second image data components Y2, U2 and V2. FIG. 5 illustrates six frames of image data using 18 buffers of the buffer memory 52, but the buffer memory 52 may include more than the 18 buffers shown.

FIG. 6 represents how the image data processor 50 stores the image data in the buffer memory 52 when the mobile device 10 is operating in the VLC mode and the image data is formatted as YUV data. Each frame of the image data uses only a single buffer of storage area because only the set of brightness components of the image data (e.g., the Y components) is stored in the buffer memory 52. Consequently, the mobile device 10 uses two-thirds less memory for buffering the image data when operating in the VLC mode as compared to operating in the photography mode. FIG. 6 illustrates 18 frames of the image data using 18 buffers of the buffer memory 52 because only the sets of brightness components Y1-Y18 are stored in the buffer memory 52. The image data processor 50 may be configured to discard the sets of chrominance components (U1-U18 and V1-V18) either before or after the VLC decoder processor 54 receives the brightness components for decoding. Discarding the chrominance components may include not sending the chrominance components to the buffer memory 52 via bus 43.

While the above description of how the buffer memory 52 is utilized by the image data processor 50 for storing image data focuses on data in a YUV format, the image data processor 50 may use the buffer memory 52 in similar ways for other types of brightness-chrominance image data formats.

Referring back to FIG. 4, with further reference to FIGS. 1-3 and 5-6, the VLC decoder processor 54 is configured to read the image data stored in buffers of the buffer memory 52 to decode the brightness components for a particular frame to obtain information encoded in the VLC signals without decoding the set of chrominance components. The VLC decoder processor 54 may, for example, send a request via the bus 43 for the brightness components from the first buffer 55 of the buffer memory 52. Once the image data from the first buffer 55 of the buffer memory 52 is decoded by the VLC decoder processor 54, the VLC decoder processor 54 sends information to the image data processor 50 indicating that the buffer is free to be re-used for storing new image data obtained by the image data processor 50. The information sent from the VLC decoder processor 54 to the image data processor 50 may include, for example, a memory address or a range of memory addresses associated with the first buffer 55.

Figure 7:
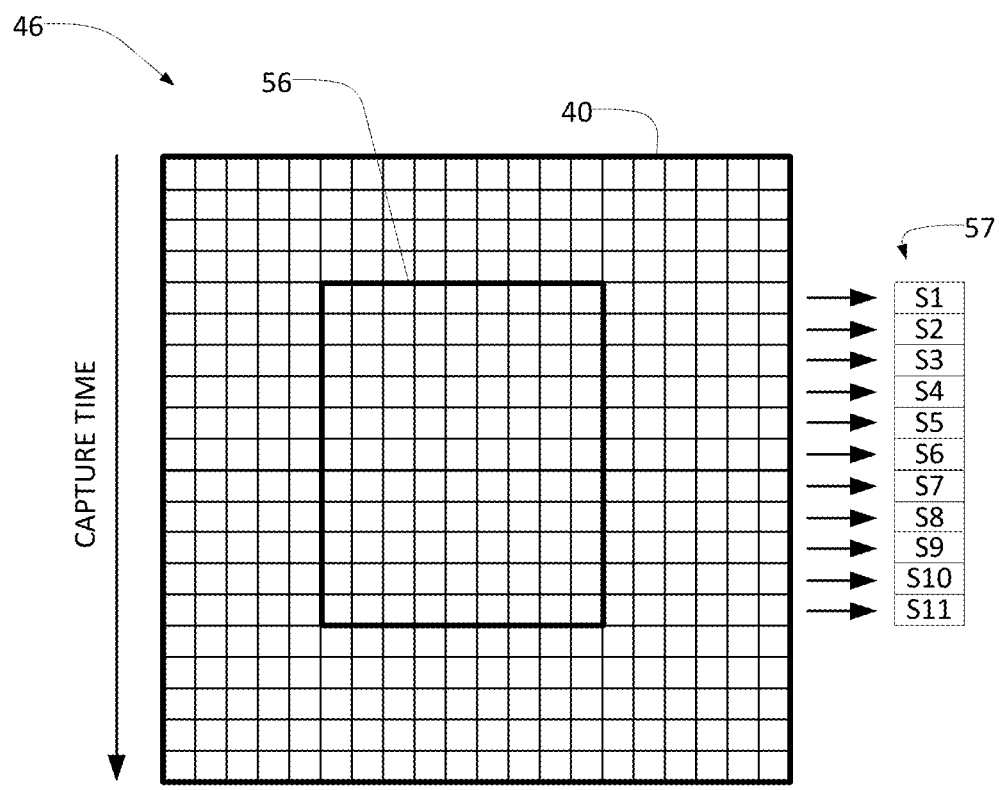
FIG. 7 is an example of an image sensor of the mobile device in FIG. 2 capturing VLC information.

Referring to FIG. 7, with further reference to FIGS. 1-5B, the image sensor 40 includes the array of pixels 46 that includes a plurality of columns of pixels and a plurality of rows of pixels. The image sensor 40 may be a rolling shutter image sensor that detects light with each row of pixels at a different time such that the pixels near the top of the image sensor 40 may detect light at a different time than pixels near the bottom of the image sensor 40. For example, the first row of pixels may detect incident light before the second row of pixels, which may capture light before the third row of pixels, etc. Each pixel of the image sensor 40 detects light and the image data processor 50 obtains a respective brightness component for each pixel. The VLC decoder processor 54 is configured to decode the brightness components associated with a frame of image data to obtain the VLC information encoded in the light that is incident on the image sensor 40. For example, because the rolling shutter causes the brightness components of particular rows of pixels to be associated with different times, the VLC information may be decoded by extracting the PWM VLC information from the relative brightness of pixels in different rows brightness components.

By way of example and not limitation, the VLC decoder processor 54 is configured to identify a region 56 of the array of pixels 46 that corresponds to detection of light from a light source that emits a VLC signal (such as the light 22 from light source 124 of FIG. 1). For example, pixels that are associated with a brightness value that is greater than a brightness threshold may be identified as being associated with the light source 12. Within the region 56, due to the rolling shutter, the different rows of pixels correspond to different times at which the light 22 emitted by the light source 12 is captured by the image sensor 40. Thus, a PWM signal can be obtained by decoding the brightness components for the pixels associated with different rows of the region 56. In one example, the pixels within a particular row in region 56 are added together to create a sum of the brightness components for each row of region 56. The sums 57 of the various brightness components are illustrated in FIG. 7 as S1-S11. For example, S1 is the sum of the nine pixels associated with the first row (i.e., the top row) of region 56; S2 is the sum of the nine pixels associated with the second row of region 56; etc. The VLC decoder processor 54 is configured to decode the sums 57 by associating each different sum with either a high or low brightness. The VLC decoder processor 54 is configured to associate the high and low brightness levels with a binary encoding, which was used by the light source 12 to encode information into the light 24 using PWM. For example, the VLC decoder processor 54 may associate sums 57 that are less than a threshold with the bit value "0" and associate sums 57 that are greater than the brightness threshold with the bit value "1." The brightness threshold may be based on the number of pixels in the row. For example, a first row with twice as many pixels as a second row may have a brightness threshold that is greater than the brightness threshold of the second row. Alternatively, the VLC decoder processor 54 may use the sums 57 to determine an average brightness value for each row of the region 56. In this case, the brightness threshold may be the same for every row in region 56. By decoding the brightness components of the image data in this way the encoded VLC information of the light 22 is obtained. The chrominance components are not decoded to obtain the information encoded in the VLC signals.

Figure 8:
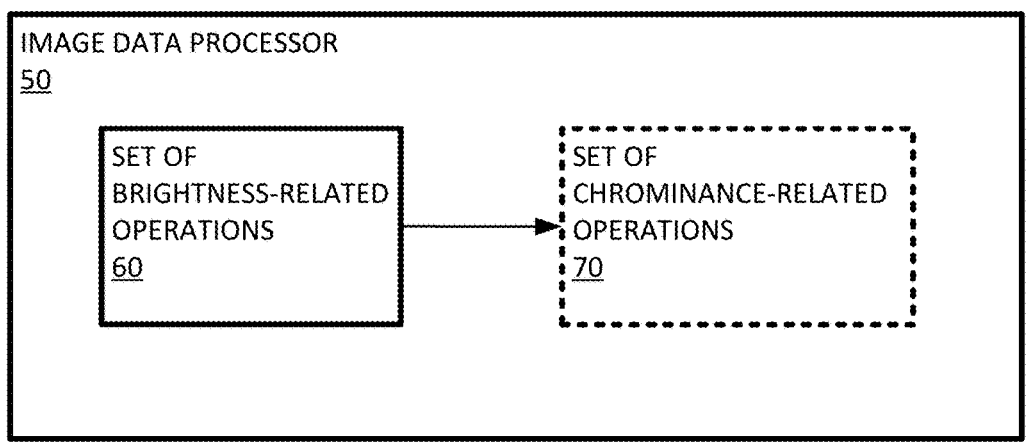
FIG. 8 is a block diagram of the image data processor of FIG. 2.

Referring to FIG. 8, with further reference to FIGS. 1-7, the image data processor 50 is configured to adjust the sensor data prior to converting the sensor data to image data. The image data processor 50 is configured to make a first adjustment to the sensor data when operating in the VLC mode and configured to make a second adjustment to the sensor data when operating in the photography mode. For example, the image data processor 50 making the second adjustment to the sensor data when operating in the photography mode may include performing a first set of operations on the sensor data. The first set of operations may be a set of operations that are used to adjust the sensor data to make the resulting image data more pleasing to a user that is creating photographs and videos using the image data. Performing the first set of operations when the image data processor 50 operates in the photography mode may include implementing a set of chrominance-related operations 60 and a set of brightness-related operations 70. On the other hand, making the first adjustment to the sensor data when the image data processor 50 operates in a VLC mode may include performing a second set of operations on the sensor data, wherein the second set of operations is a subset of the first set of operations. For example, performing the second set of operations when the image data processor 50 operates in the VLC mode may include implementing only the set of brightness-related operations 60, but not implementing the set of brightness-related operations 70 (this is illustrated in FIG. 8 with the dashed line for module 70 indicating that the set of brightness-related operations 70 is used by the image data processor 50 while operating in the photography mode, but not while operating in the VLC mode). By limiting the adjustments to the set of brightness-related operations 60, which make adjustments that affect the ability to accurately obtain information encoded in the light, but not the set of chrominance-related operations 70, the mobile device 10 saves both time and battery power. Additionally, the image data processor 50 may not make additional adjustments while operating in the VLC mode beyond the adjustments the image data processor 50 makes while operating in the photography mode. The adjustments made by the image data processor 50 while operating in the VLC mode are a subset of the adjustments made while operating in the photography mode, where a subset in this case means a "strict subset," meaning the number of adjustments made while operating in the VLC mode is less than the number of adjustments made in the photography mode. For example, the image data processor 50 may perform on the order of 20 different operations to adjust the sensor data while operating in the photography mode, whereas the image data processor 50 may perform only 4-5 of those 20 operations to adjust the sensor data while operating in the VLC mode.

Figure 9:
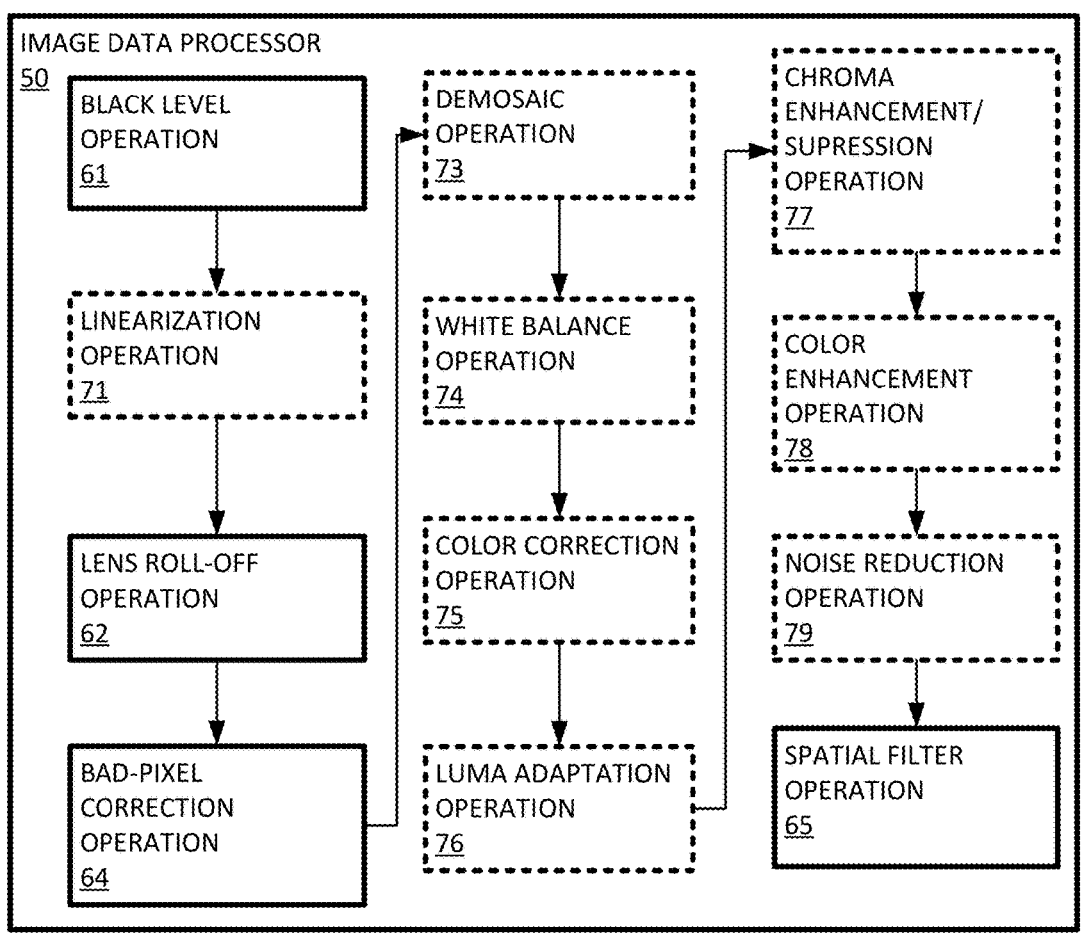
FIG. 9 is a block diagram of the image data processor of FIG. 2.

Referring to FIG. 9, with further reference to FIGS. 1-8, the image data processor 50 is configured to adjust the sensor data using a number of operations. The operations of FIG. 7B are grouped into one of two categories: operations included in the set of brightness-related operations 60 (illustrated with a solid line) and operations included in the set of chrominance-related operations 70 (illustrated with a dashed line). In contrast with FIG. 8, which illustrates (for the sake of clarity, not limitation) the set of brightness-related operations 60 processing the sensor data and passing the processed data to the set of chrominance-related operations 70 for additional processing, the brightness-related operations of FIG. 7B are intermixed with the chrominance-related operations. For example, a first brightness-related operation 61 operates on the sensor data, then a first chrominance-related operation 71 operates on the sensor data (as processed by the operation 61), then a second brightness related operation 62 operates on the sensor data (as processed by the operations 61 and 71). For the purposes of classifying an operation, a brightness-related operation is an operation that adjusts the sensor data in way that does not change the resulting chrominance components of the image data when the processed sensor data is converted to image data, whereas a chrominance-related operation is an operation that adjusts the sensor data in way that does change the resulting chrominance components of the image data when the processed sensor data is converted to image data.

The image data processor 50 illustrated in FIG. 9 includes 14 different operations that make up the processing pipeline for automatically adjusting the sensor data from the image sensor 40. The image data processor 50 is configured to adjust the sensor data using all 14 operations (operations 61-65 and operations 71-79) when operating in the photography mode, but only adjust the sensor data using the five brightness-related operations 61-65 when operating in the VLC mode.

The at least one brightness-related operation 60 includes a black level operation 61, a lens roll-off operation 62, a bad-pixel correction operation 64 and an adaptive spatial filter operation 65. The black level operation 61 adjusts the overall brightness offset from all the pixels of the sensor data. For example, this operation may correct for the base offset in brightness caused by dark currents of the photodetectors associated with each pixel of the image sensor 40. Implementing the black level operation 61 increases the contrast of the resulting image. The lens roll-off operation 62 adjusts the brightness of the sensor data near the edges and corners of the sensor data. Such lens roll-off corrections are used to correct for a decrease in brightness for pixels at the edges of the image sensor 40 relative the brightness for pixels at the center of the image sensor 40. For example, gains, derived from a previous calibration process, may be applied to the edge and/or corner pixels of the image sensor. Lens roll-off effects may be caused, for example, by an imperfect imaging lens or the pixel structure blocking light incident at large incidence angles. The bad-pixel correction operation 64 adjusts the sensor data to reduce the effects that result from defective pixels. For example, the bad-pixel correction operation 64 may replace a color of a defective pixel with a color of a neighboring pixel or the average color of pixels surrounding the defective pixel. The spatial filter operation 65 adjusts the brightness of a pixel based on the brightness of neighboring pixels and/or the spatial frequencies of the sensor data. Examples of spatial filtering include Gaussian filters, high-pass filtering, low-pass filtering and adaptive filtering. One result of the spatial filter operation 65 may include enhancing the sharpness of the resulting image.

The at least one chrominance-related operation 70 includes a linearization operation 71, a demosaic operation 73, a white balance operation 74, a color correction operation 75, a luma adaptation operation 76, a chroma enhancement/suppression operation 77, a color enhancement operation 78, and a noise reduction operation 79. The linearization operation 71 adjusts the sensor data by linearizing the color space. The sensor data may be nonlinear as a result of the electronics of the image sensor creating nonlinear data due to, for example, different lighting conditions or color temperatures. The demosaic operation 73 adjusts for the mosaic of color filters that are placed over the photodetectors of the image sensor 40 (e.g., the Bayer filter mosaic). The result of the demosaic operation 73 is full color data created from the incomplete color sampling resulting from the filter mosaic. The white balance operation 74 adjusts the relative color balance of the sensor data in order to compensate for color differences between different light sources that can cause white objects to appear colored, rather than white. For example, fluorescent lighting, incandescent lighting and natural light sources can result in white objects appearing non-white. The white balance operation 74 adjusts the relative brightness of the different colors of the sensor data to correct for the coloring of white objects resulting from different lighting situations. The color correction operation 75 may, for example, perform additional color correction beyond the white balance operation 74. For example, adjustments to the red components of the sensor data relative to the blue components of the sensor data may be made. Additionally, gamma corrections can be made by the color correction operation 75. The corrections may convert the sensor data from a sensor dependent color space to a sensor independent color space. The luma adaptation operation 76 adjusts the sensor data based on luma data extracted from the sensor data. For example, a transfer function may be derived from the luma data and applied to the sensor data to increase the dynamic range of the sensor data. The chroma enhancement/suppression operation 77 adjusts the chroma components of the sensor data to correct for color related artifacts in the image. For example, chroma suppression can reduce excess color noise, referred to as chroma clipping, which may result from pixel interpolation; chroma enhancement may increase one chroma component of the sensor data relative to another chroma component in order to create an image with higher dynamic range. The color enhancement operation 78 adjusts the color of portions of the sensor data to be more pleasing to the human eye. For example, the color enhancement operation 78 may be a memory color enhancement where objects that are known by a human (i.e., in the human's memory) can be adjusted to a more pleasing color. For example, if the processor identifies plants in the sensor data, the sensor data may be adjusted to be a more pleasing shade of green; or, if the processor identifies skin in the sensor data, the sensor data may be adjusted to be a more pleasing shade of skin color. The noise reduction operation 79 adjusts the sensor data by reducing the noise from, for example, optical noise, electrical noise, digital noise and power noise. The noise reduction operation 79 may include averaging similar neighboring pixels.

Figure 10:
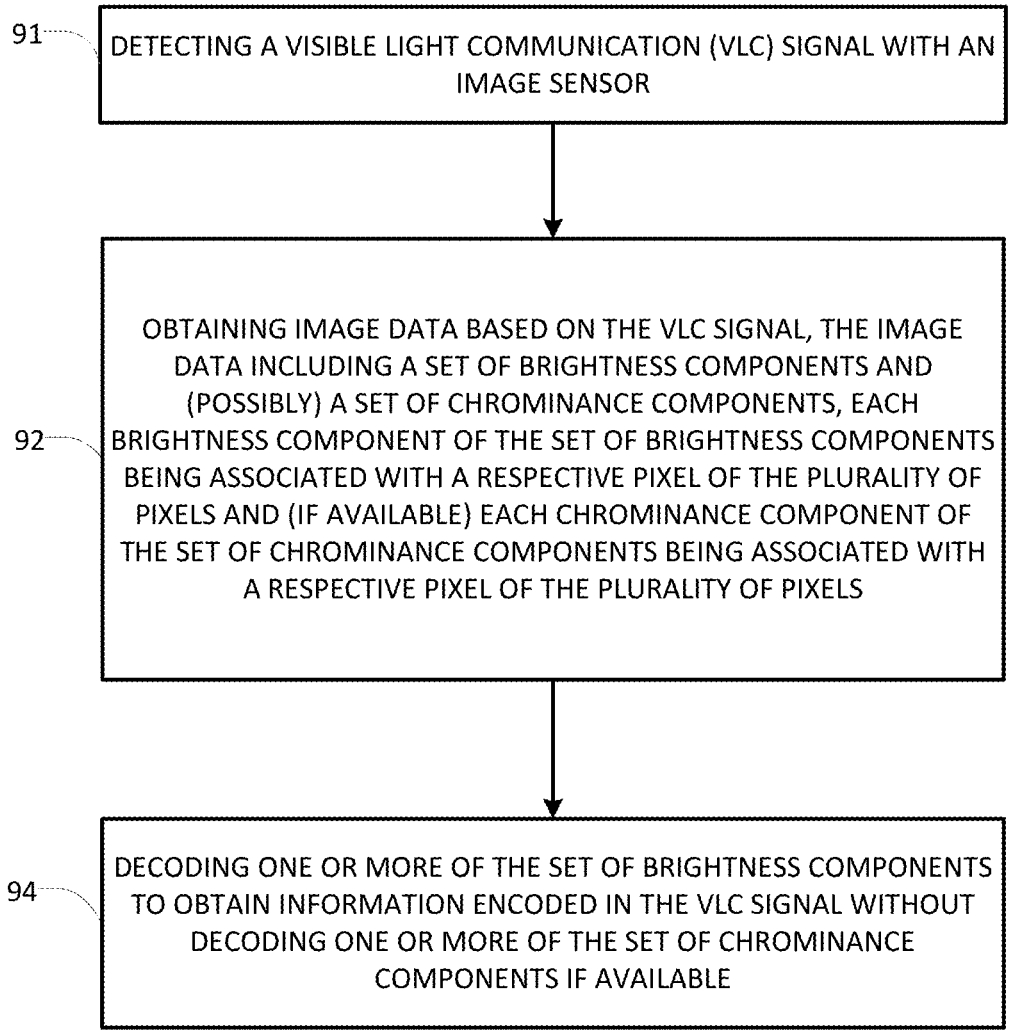
FIG. 10 is a flow chart of an example method of operating the device of FIG. 2.

Referring to FIG. 10, with further reference to FIGS. 1-9, a method 90 of operating the mobile device 10 that includes the image sensor 40 comprising a plurality of pixels includes the stages shown. The method 90 is, however, an example only and not limiting. The method 90 can be altered, e.g., by having stages added, removed, rearranged, combined, performed concurrently, and/or having single stages split into multiple stages.

At stage 91, the method 90 includes detecting one or more VLC signals with the image sensor 40. The image sensor 40 may, for example, be activated to detect VLC signals automatically or based on input from the user 11 via user interface 39. The mobile device 10 may operate in the photography mode or the VLC mode when detecting light incident on the image sensor 40. The image sensor 40 is a multi-color image sensor, such as a conventional RGB image sensor that includes the array of pixels 46. Each pixel of the array of pixels 46 detects light incident on that pixel. The light incident on a particular pixel may include VLC signals from a light source, such as the light sources 12-14. In response to detecting light, each pixel of the array of pixels 46 may, for example, output one or more corresponding electrical detection signals. The electrical detection signals may include information about the amount of light detected by pixels of the array of pixels 46. In certain example implementations, the image sensor 40 may include a processor and/or circuitry for converting the detection signals into sensor data that indicates the amount of light detected by each pixel. The sensor data may comprise one or more image files that include information about the amount of red, green and blue light detected at each pixel, such as RGB data.

At stage 92, the method 90 includes obtaining image data based on the VLC signals, the image data including a set of brightness components and possibly a set of chrominance components, each brightness component of the set of brightness components being associated with a respective pixel of the array of pixels 46 and (if available) each chrominance component of the set of chrominance components being associated with a respective pixel of the array of pixels 46. Various brightness image data formats or brightness-chrominance image data formats may be used by the image data processor 50. By way of some examples, in certain implementations brightness-chrominance image data may include information encoded in one of a YUV format, a Y'UV format, a YCbCr format, a Y'CbCr format, a YPbPr format, or a LAB format.

Figure 11:
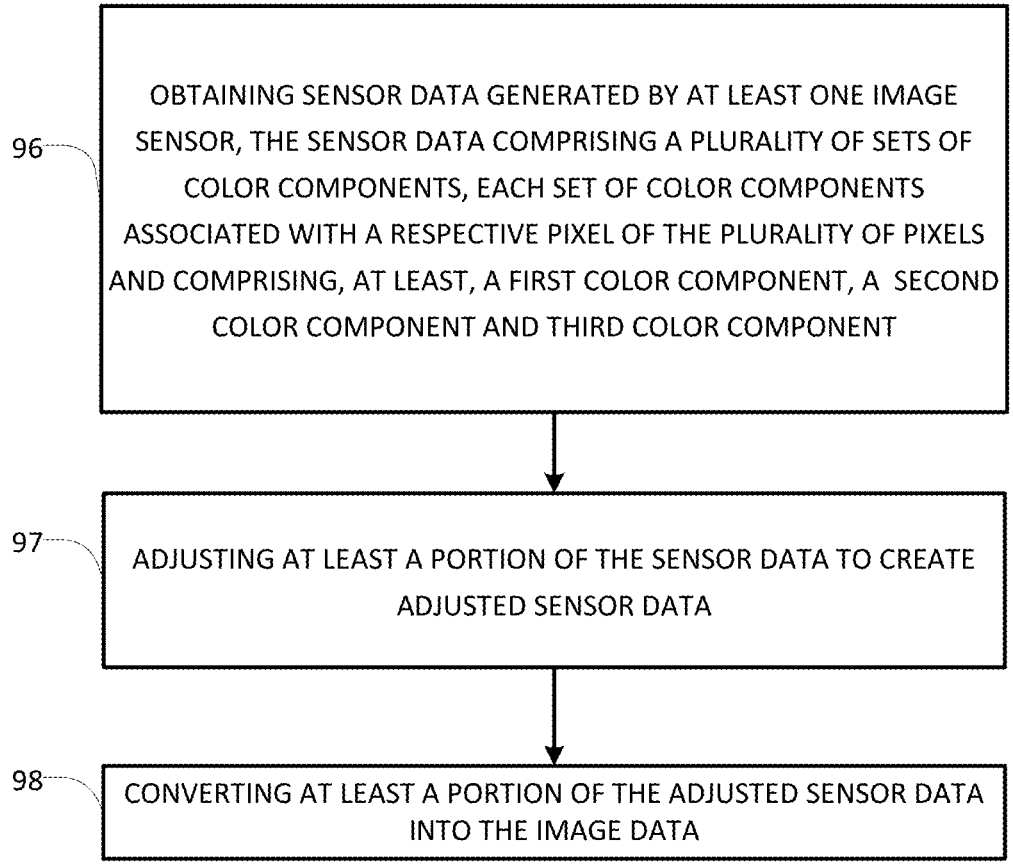
FIG. 11 is a flow chart of an example method of obtaining image data as shown in FIG. 10.

Referring to FIG. 11, with further reference to FIGS. 1-10, the stage 92 of method 90 may include the sub-stages shown. The sub-stages of FIG. 11 are, however, examples only and not limiting. The sub-stages of FIG. 11 can be altered, e.g., by having stages added, removed, rearranged, combined, performed concurrently, and/or having single stages split into multiple stages.

At sub-stage 96, the stage 92 includes obtaining (possibly raw) sensor data from the image sensor, such sensor data may include a plurality of sets of color components, each set of color components being associated with a respective pixel of the plurality of pixels and comprising a first color component, a second color component and third color component. For example, as discussed above, sensor data may include RGB data created by processing the electrical detection signals generated by the individual pixels of the image sensor 40. The sensor data may be obtained by the image data processor 50 via the bus 43 directly from the image sensor 40 or indirectly via the memory 31, which may in certain implementations store the sensor data from the image sensor 40 prior to sending the sensor data to the image data processor 50.

At sub-stage 97, the stage 92 includes adjusting, for example using the image data processor 50, the sensor data to create adjusted sensor data. The adjustments to the sensor data may be part of a processing pipeline for processing the sensor data to make it suitable for photographic purposes, VLC purposes, etc. Thus, in certain implantations, mobile device 10 and the processor 30 (e.g., the image data processor 50) may operate in a photography mode, a VLC mode, a combined photography/VLC mode, or other like mode(s) when processing the sensor data (which may in certain implementations comprise sensor data.

Figure 12:
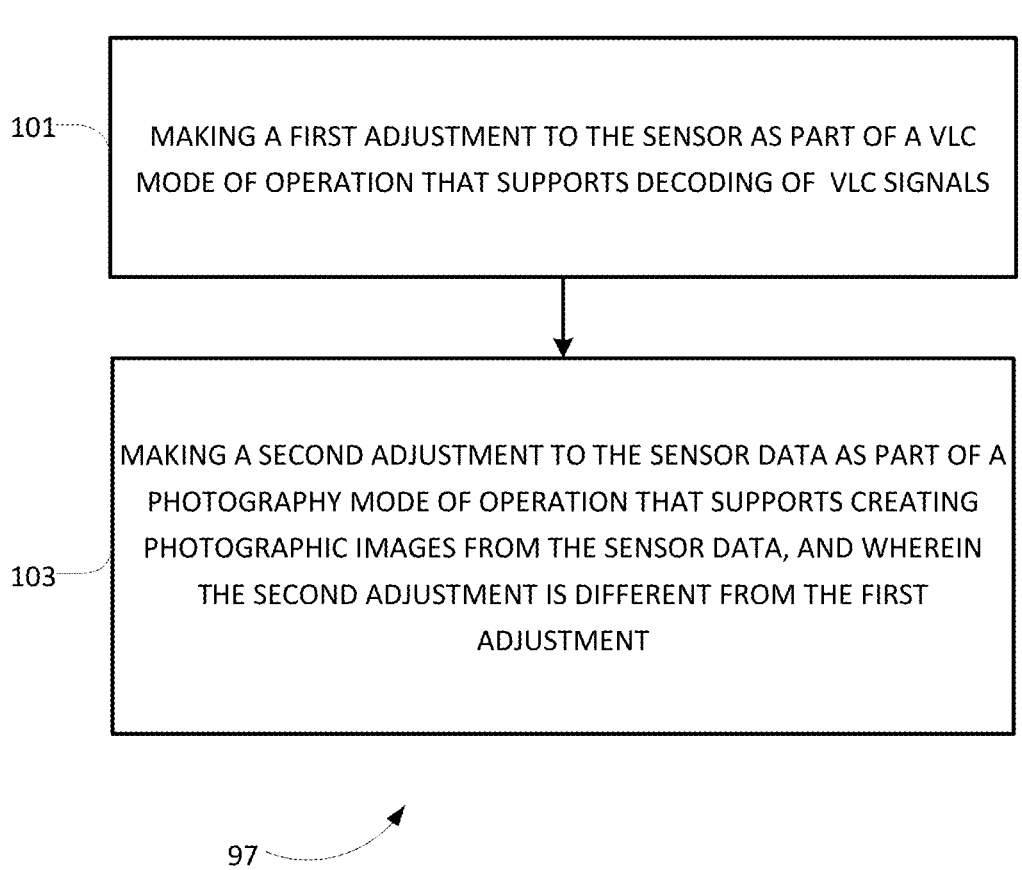
FIG. 12 is a flow chart of an example method of adjusting sensor data as shown in FIG. 11.

Referring to FIG. 12, with further reference to FIGS. 1-11, the sub-stage 97 may itself include the additional sub-stages shown. The sub-stages of FIG. 12 are, however, examples only and not limiting. The sub-stages of FIG. 12 can be altered, e.g., by having stages added, removed, rearranged, combined, performed concurrently, and/or having single stages split into multiple stages.

At sub-stage 101, the sub-stage 97 of FIG. 11 includes making a first adjustment to the sensor data, for example, if the image data processor 50 is in a VLC mode, the VLC mode being a mode of operation of the processor used for decoding VLC signals. At sub-stage 103, the sub-stage 97 of FIG. 11 includes making a second adjustment to the sensor data, for example, if the image data processor 50 is in photography mode, the photography mode being a mode of operation of the image data processor 50 used for creating photographic images from the sensor data, and the second adjustment being different from the first adjustment. For example, the second adjustment to the sensor data if the image data processor 50 is in photography mode may include performing a first set of operations on the sensor data, and making the first adjustment to the sensor data if the processor is in a VLC mode may include performing a second set of operations on the sensor data. The second set of operations is a subset of the first set of operations such that there are fewer operations in the second set of operations than in the first set of operations.

By way of example and not limitation, performing the second set of operations if the image data processor 50 is in the VLC mode may include implementing operations related to the brightness of the image data, but not implementing operations related to the chrominance of the image data. Performing the first set of operations when the image data processor 50 is in the photography mode may include implementing operations related to the brightness of the image data and implementing operations related to the chrominance of the image data. The operations performed by the image data processor 50 while operating in VLC mode are a subset of the adjustments made while operating in photography mode. For example, on the order of twenty different distinct operations may be used to adjust the sensor data when the mobile device is operating in the photography mode, whereas only four or five operations of those twenty distinct operations may be used to adjust the sensor data when the mobile device 10 is operating in a VLC mode or the like.

Referring back to FIG. 11, at sub-stage 98, the stage 92 of FIG. 10 includes converting the adjusted sensor data into the image data. For example, the adjusted sensor data may be in an RGB format. The image data processor 50 converts the RGB data into a brightness-chrominance image data format, such as YUV, Y'UV, YCbCr, Y'CbCr, YPbPr, and LAB.

Referring back to FIG. 10, at stage 94 the method 90 includes decoding the set of brightness components to obtain information encoded in the VLC signals using a processor for the device without decoding the set of chrominance components. The image data processor 50 may save the brightness components in the buffer memory 52 until the VLC decoder processor 54 is ready to decode the next set of brightness components associated with the image data. When the mobile device is operating in the VLC mode, only the set of brightness components are saved in the buffer memory 52 (see FIG. 6) and the set of chrominance components of the image data are not saved. Thus the amount of buffer memory 52 used to store the image data is reduced by a factor of ⅔ with respect to the amount of buffer memory 52 used to store the image data when the mobile device 10 is operating in the photography mode because when operating in the photography mode the mobile device 10 stores both the set of brightness components and the set of chrominance components (see FIG. 5).

The VLC decoder processor 54 reads a set of brightness components from a buffer of the buffer memory 52 to decode the brightness components for a particular frame. The decoding of the brightness components allows the VLC decoder processor to obtain information encoded in the VLC signals without decoding the set of chrominance components. The VLC decoder processor 54 may, for example, request the brightness components from a particular buffer of the buffer memory 52. Once a particular buffer from the buffer memory 52 is decoded by the VLC decoder processor 54, the VLC decoder processor 54 sends information to the image data processor 50 indicating that the buffer is free to be re-used for storing new image data being obtained by the image data processor 50.

The VLC decoder processor 54 may identify a region 56 of the pixel array that corresponds to a light source that is emitting VLC signals (see FIG. 7). The region may be identified by assigning pixels of the image sensor 40 that are associated with a brightness greater than a brightness threshold as being part of the region 56. Because of the rolling shutter of the image sensor 40, each row of the pixel array 46 detects VLC signals at a different time. Thus, the time-varying VLC signal can be decoded by the VLC decoder processor 54 by analyzing the brightness components of each row of pixels.

By way of example and not limitation, the VLC decoder processor 54 may add the brightness of the pixels within a particular row in region 56 to create a sum 57 for each row. The sums 57 of the various brightness components are illustrated in FIG. 7 as S1-S11. The VLC decoder processor 54 decodes the sums 57 by associating each different sum with either a high or low brightness. The VLC decoder processor 54 assigns a bit value "0" or a bit value "1" to the rows based on whether the row is a high brightness level or a low brightness level. For example, the VLC decoder processor 54 may associate sums 57 that are less than a threshold with the bit value "0" and associate sums 57 that are greater than a threshold with the bit value "1." In this way, VLC information that is encoded in the VLC signals by decoding the set of brightness components. The chrominance components are not decoded to obtain the information encoded in the VLC signals.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

A wireless network is a communication system in which communications are conveyed wirelessly, i.e., by electromagnetic and/or acoustic waves propagating through atmospheric space rather than through a wire or other physical connection. A wireless network may not have all communications transmitted wirelessly, but is configured to have at least some communications transmitted wirelessly.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions.

The processes, systems, and devices discussed above are examples. Various configurations may omit, substitute, or add various procedures or components as appropriate. For instance, in alternative configurations, the processes may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable storage medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of example implementations. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A method of operating a device that includes an image sensor comprising a plurality of pixels, the method comprising:
    detecting visible light communication (VLC) signals with the image sensor;
    obtaining image data based on the VLC signals, the image data comprising a set of brightness components and a set of chrominance components, wherein each brightness component of the set of brightness components is associated with a respective pixel of the plurality of pixels; and
    decoding one or more of the set of brightness components to obtain information encoded in the VLC signals using a processor of the device without decoding one or more of the set of chrominance components if included within the image data.

2. The method of claim 1, further comprising storing only the set of brightness components in a memory for use in decoding the VLC signals.

3. The method of claim 2, further comprising:
    discarding the set of chrominance components, if included within the image data, prior to decoding the set of brightness components.

4. The method of claim 1, wherein the obtaining the image data comprises:
    obtaining sensor data from the image sensor;
    making a first adjustment to the sensor data when the processor is operating in a VLC mode to create adjusted sensor data, wherein the VLC mode is a mode of operation of the processor used for decoding the VLC signals; and
    making a second adjustment to the sensor data when the processor is operating in a photography mode, wherein the photography mode is a mode of operation of the processor used for creating photographic images from the sensor data, and wherein the second adjustment is different from the first adjustment.

5. The method of claim 4, wherein:
    the making the second adjustment to the sensor data when the processor is operating in the photography mode comprises performing a first set of operations on the sensor data; and
    the making the first adjustment to the sensor data when the processor is operating in the VLC mode comprises performing a second set of operations on the sensor data, wherein the second set of operations is a subset of the first set of operations.

6. The method of claim 5, wherein:
    the performing the first set of operations when the processor is operating in the photography mode comprises processing the sensor data using at least one chrominance-related operation and at least one brightness-related operation; and
    the performing the second set of operations when the processor is operating in the VLC mode comprises processing the sensor data using, from among the at least one brightness-related operation and the at least one chrominance-related operation, only the at least one brightness-related operation.

7. The method of claim 1, wherein the image data comprises raw image data.

8. The method of claim 1, further comprising determining a location of the device based on the set of brightness components.

9. A device comprising:
    an image sensor comprising a plurality of pixels, the image sensor configured to detect visible light communication (VLC) signals;
    a processor configured to:
        obtain image data based on the VLC signals, the image data comprising a set of brightness components and a set of chrominance components, wherein each brightness component of the set of brightness components is associated with a respective pixel of the plurality of pixels; and
        decode one or more of the set of brightness components to obtain information encoded in the VLC signals without decoding one or more of the set of chrominance components if included within the image data.

10. The device of claim 9, further comprising a memory configured to store the set of brightness components, and wherein the processor is further configured to cause the memory to store only the set of brightness components for use in decoding the VLC signals.

11. The device of claim 10, wherein the processor is further configured to discard the set of chrominance components, if included within the image data, prior to decoding the set of brightness components.

12. The device of claim 9, wherein the processor is configured to:

obtain sensor data from the image sensor;
make a first adjustment to the sensor data when the processor is operating in a VLC mode to create adjusted sensor data, wherein the VLC mode is a mode of operation of the processor used for decoding the VLC signals; and
make a second adjustment to the sensor data when the processor is operating in a photography mode, wherein the photography mode is a mode of operation of the processor used for creating photographic images from the sensor data, and wherein the second adjustment is different from the first adjustment.

13. The device of claim 12, wherein:
the processor is configured to make the second adjustment to the sensor data when the processor is operating in the photography mode by performing a first set of operations on the sensor data; and
the processor is configured to make the first adjustment to the sensor data when the processor is operating in the VLC mode by performing a second set of operations on the sensor data, wherein the second set of operations is a subset of the first set of operations.

14. The device of claim 13, wherein:
the processor is configured to perform the first set of operations when the processor is operating in the photography mode by processing the sensor data using at least one chrominance-related operation and at least one brightness-related operation; and
the processor is configured to perform the second set of operations when the processor is operating in the VLC mode by processing the sensor data using, from among the at least one brightness-related operation and the at least one chrominance-related operation, only the at least one brightness-related operation.

15. The device of claim 9, wherein the image data comprises raw image data.

16. The device of claim 9, wherein the processor is further configured to determine a location of the device based on the set of brightness components.

17. A device comprising:
means for detecting visible light communication (VLC) signals including a plurality of pixels;
means for obtaining image data based on the VLC signals, the image data comprising a set of brightness components and a set of chrominance components, wherein each brightness component of the set of brightness components is associated with a respective pixel of the plurality of pixels; and
means for decoding one or more of the set of brightness components to obtain information encoded in the VLC signals without decoding one or more of the set of chrominance components if included within the image data.

18. The device of claim 17, further comprising means for storing only the set of brightness components for use in decoding the VLC signals.

19. The device of claim 17, further comprising means for discarding the set of chrominance components, if included within the image data, prior to decoding the set of brightness components.

20. The device of claim 17, wherein the means for obtaining image data comprises:
means for obtaining sensor data from the means for detecting VLC signals;
means for making a first adjustment to the sensor data if the device is operating in a VLC mode, wherein the VLC mode is a mode of operation of the device used for decoding the VLC signals; and
means for making a second adjustment to the sensor data if the device is operating in a photography mode, wherein the photography mode is a mode of operation of the device used for creating photographic images from the sensor data, and wherein the second adjustment is different from the first adjustment.

21. The device of claim 20, wherein:
the means for making the second adjustment comprise means for performing a first set of operations on the sensor data; and
the means for making the first adjustment comprise means for performing a second set of operations on the sensor data, wherein the second set of operations is a subset of the first set of operations.

22. The device of claim 21 wherein:
the means for performing the first set of operations comprise means for processing the sensor data with at least one chrominance-related operation and at least one brightness-related operation; and
the means for performing the second set of operations comprise means for processing the sensor data using the at least one brightness-related operation.

23. The device of claim 17, further means for determining a location of the device based on the set of brightness components.

24. A non-transitory, processor-readable storage medium comprising processor-readable instructions configured to cause a processor of a device that includes an image sensor comprising a plurality of pixels to:
obtain image data based on visible light communication (VLC) signals detected by the image sensor, the image data comprising a set of brightness components and a set of chrominance components, wherein each brightness component of the set of brightness components is associated with a respective pixel of the plurality of pixels; and
decode one or more of the set of brightness components to obtain information encoded in the VLC signals without decoding one or more of the set of chrominance components if included within the image data.

25. The non-transitory, processor-readable storage medium of claim 24, further comprising instructions configured to cause the processor to store only the set of brightness components in a memory for use in decoding the VLC signals.

26. The non-transitory, processor-readable storage medium of claim 24, further comprising instructions configured to cause the processor to discard the set of chrominance components, if included within the image data, prior to decoding the set of brightness components.

27. The non-transitory, processor-readable storage medium of claim 24, wherein the instructions configured to cause the processor to obtain the image data comprise instructions configured to cause the processor to:
obtain sensor data from the image sensor;
make a first adjustment to the sensor data when the processor is in a VLC mode, wherein the VLC mode is a mode of operation of the processor used for decoding the VLC signals; and
make a second adjustment to the sensor data when the processor is operating in a photography mode, wherein the photography mode is a mode of operation of the processor used for creating photographic images from the sensor data, and wherein the second adjustment is different from the first adjustment.

28. The non-transitory, processor-readable storage medium of claim 27, wherein:
- the instructions configured to cause the processor to make the second adjustment to the sensor data when the processor is operating in the photography mode comprise instructions configured to cause the processor to perform a first set of operations on the sensor data; and
- the instructions configured to cause the processor to make the first adjustment to the sensor data when the processor is operating in the VLC mode comprise instructions configured to cause the processor to perform a second set of operations on the sensor data, wherein the second set of operations is a subset of the first set of operations.

29. The non-transitory, processor-readable storage medium of claim 28, wherein:
- the instructions configured to cause the processor to perform a first set of operations on the sensor data comprise instructions configured to cause the processor to process the sensor data using at least one chrominance-related operation and at least one brightness-related operation; and
- the instructions configured to cause the processor to perform a second set of operations on the sensor data comprise instructions configured to cause the processor to process the sensor data using, from among the at least one brightness-related operation and the at least one chrominance-related operation, only the at least one brightness-related operation.

30. The non-transitory, processor-readable storage medium of claim 24, further comprising instructions configured to cause the processor to determine a location of the device based on the set of brightness components.

* * * * *